(12) United States Patent
Yi

(10) Patent No.: US 7,437,020 B2
(45) Date of Patent: Oct. 14, 2008

(54) DIGITAL IMAGE PROCESSING DEVICE AND METHOD

(75) Inventor: Jong-hyon Yi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 741 days.

(21) Appl. No.: 10/778,154

(22) Filed: Feb. 17, 2004

(65) Prior Publication Data

US 2005/0078883 A1  Apr. 14, 2005

(30) Foreign Application Priority Data

Oct. 8, 2003  (KR) .................. 10-2003-0069837

(51) Int. Cl.
*G06K 9/32*  (2006.01)

(52) U.S. Cl. .................................... 382/300

(58) Field of Classification Search ......... 382/293–300; 345/606, 475, 523, 42–61; 358/525
See application file for complete search history.

(56) References Cited

U.S. PATENT DOCUMENTS

| 5,754,710 | A | * | 5/1998 | Sekine et al. ............... 382/300 |
| 5,875,268 | A | * | 2/1999 | Miyake ...................... 382/276 |
| 5,953,465 | A | * | 9/1999 | Saotome .................... 382/300 |
| 5,991,464 | A | * | 11/1999 | Hsu et al. .................. 382/300 |
| 6,205,259 | B1 | * | 3/2001 | Komiya et al. .............. 382/284 |
| 6,392,765 | B1 | * | 5/2002 | Sakaida ..................... 358/525 |
| 6,424,749 | B1 | * | 7/2002 | Zhu et al. ................... 382/260 |
| 6,510,254 | B1 | * | 1/2003 | Nakami et al. .............. 382/300 |
| 6,943,821 | B2 | * | 9/2005 | Abe et al. ................... 348/65 |

FOREIGN PATENT DOCUMENTS

| JP | 08-125842 | 5/1996 |
| JP | 08-297739 | 11/1996 |
| JP | 2001-177719 | 6/2001 |
| KR | 2000-0051201 | 8/2000 |
| WO | WO01/67392 | 9/2001 |

* cited by examiner

*Primary Examiner*—Yosef Kassa
*Assistant Examiner*—Jayesh A Patel
(74) *Attorney, Agent, or Firm*—Roylance, Abrams, Berdo & Goodman, L.L.P.

(57) ABSTRACT

A digital image processing device and method for performing edge compensation (sharpening) and emphasis. The digital image processing device and method each employ a first interpolation unit for applying a predetermined interpolation scheme with respect to low-resolution input image information, and outputting first interpolation image information; and a compensation unit for producing binary values with respect to the first interpolation image information using the input image information and the first interpolation image information, and compensating for the first interpolation image information based on the binary values. The device and method also each employ a second interpolation unit for applying a predetermined interpolation scheme with respect to the input image information, and outputting second interpolation image information; and an emphasis unit for emphasizing the compensated first interpolation image information using the second interpolation image information.

18 Claims, 6 Drawing Sheets

DIGITAL IMAGE PROCESSING DEVICE AND METHOD

CROSS-REFERENCE TO RELATED APPLICATIONS

This application claims the benefit of Korean Patent Application No. 2003-69837, filed on Oct. 8, 2003, in the Korean Intellectual Property Office, the disclosure of which is incorporated herein by reference.

BACKGROUND

1. Field of the Invention

The present invention relates to a digital image processing device, and more particularly, to a digital image processing device and a method for forming natural edge shapes for enlarged images and simultaneously emphasizing edge brightness contrast.

2. Description of the Related Art

In order to enlarge an original digital image into a larger digital image, the relationship between each position of the original digital image and each position of the enlarged digital image are calculated, and a pixel value of each position of the enlarged image is calculated in terms of pixels adjacent to each position of the enlarged image and each position of the mapped original image. If an original image pixel at each mapped position exists, a value of the pixel can be obtained, but, if the original image pixel does not exist, a new pixel value has to be calculated in terms of the adjacent pixels.

A convolution method exists for calculating new pixel values, wherein an added value of pixels adjacent to a target pixel to a position of the target pixel are allocated, and the added values are constructed in an arrangement called convolution kernel or masking. However, the convolution method has a problem of blurring edges when enlarging images at a high enlargement factor.

In order to reduce the problem, unsharp masking is performed to emphasize the blurred edges. Specifically, the blurred portions of the original image are removed to improve image sharpness. However, when the unsharp masking is performed, the stair-stepping artifact which occurs on the edges of an enlarged image is emphasized, which results in jagged edges.

SUMMARY

Accordingly, it is an objective of the present invention to provide a digital image processing device and method capable of forming natural edges of enlarged images and simultaneously emphasizing the edge brightness contrast.

In order to substantially achieve the above objective, a digital image processing device according to an embodiment of the present invention comprises a first interpolation unit for applying a predetermined interpolation scheme with respect to low-resolution input image information, and outputting first interpolation image information; and a compensation unit for producing binary values with respect to the first interpolation image information using the input image information and the first interpolation image information, and compensating for the first interpolation image information based on the binary values. The device further includes a second interpolation unit for applying a predetermined interpolation scheme with respect to the input image information, and outputting second interpolation image information; and an emphasis unit for emphasizing the compensated first interpolation image information using the second interpolation image information.

The digital image processing device further comprises an emphasis coefficient determination unit for determining an emphasis coefficient based on the input image information, wherein the emphasis unit emphasizes the compensated first interpolation image information using the emphasis coefficient that was determined in the emphasis coefficient determination unit and the second interpolation image information.

Preferably, the emphasis unit emphasizes the compensated first interpolation image information using the emphasis coefficient determined by selection from at least one or more predetermined emphasis coefficients and the second interpolation image information.

The first interpolation image information out emphasized by the emphasis unit is expressed in an equation as follows:

$$OUT = \hat{q} + fe \times (\hat{q} - b),$$

wherein $\hat{q}$ denotes a compensated first interpolation image information, fe an emphasis coefficient, and b a second interpolation image information.

More preferably, the first interpolation unit produces the first interpolation image information using a high-order interpolation scheme, and the second interpolation unit produces the second interpolation image information using a linear interpolation scheme.

The compensation unit includes a quantization unit for generating the binary values with respect to the first interpolation image information using the input image information and the first interpolation image information; an allocation ratio determination unit for determining predetermined allocation ratios using pixel values of pixels adjacent to a target pixel of the input image information; and an adder for adding the binary values and the first interpolation image information to which the allocation ratios are respectively applied, and outputting the compensated first interpolation image information.

The quantization unit includes a detector for detecting the predetermined number of pixel values from pixel values of the pixels adjacent to the target pixel of the input image information; a threshold value calculator for calculating a threshold value using the pixel values of the adjacent pixels; and a determination unit for comparing the first interpolation image information and the threshold value, and determining and outputting either a maximum value or a minimum value based on a comparison result.

For example, the detector detects the maximum value and the minimum value from the pixel values of the adjacent pixels, and the threshold value calculator calculates the threshold value using the maximum value and the minimum value.

A digital image processing method for a digital image processing device according to the present invention comprises steps of applying a predetermined interpolation scheme with respect to low-resolution input image information, and outputting first interpolation image information; and producing binary values with respect to the first interpolation image information using the input image information and the first interpolation image information, and compensating for the first interpolation image information based on the binary values. The method further comprises applying a predetermined interpolation scheme with respect to the input image information, and outputting second interpolation image information; and emphasizing the compensated first interpolation image information using the second interpolation image information.

The digital image processing method further comprises a step of determining an emphasis coefficient based on the input image information, wherein the emphasis step emphasizes the compensated first interpolation image information using the determined emphasis coefficient and the second interpolation image information.

Preferably, the emphasis step emphasizes the compensated first interpolation image information using the emphasis coefficient determined by user's selection from at least one or more predetermined emphasis coefficients and the second interpolation image information.

Accordingly, the embodiment of the present invention can form natural edges of enlarged images and simultaneously emphasizes edge brightness contrast, to thereby improve the quality of the enlarged images.

BRIEF DESCRIPTION OF THE DRAWINGS

The invention will be described in detail with reference to the following drawings in which like reference numerals refer to like elements, and wherein.

DETAILED DESCRIPTION OF THE PREFERRED EMBODIMENTS

Hereinafter, the present invention will be described in detail with reference to the accompanying drawings.

Figure 1:
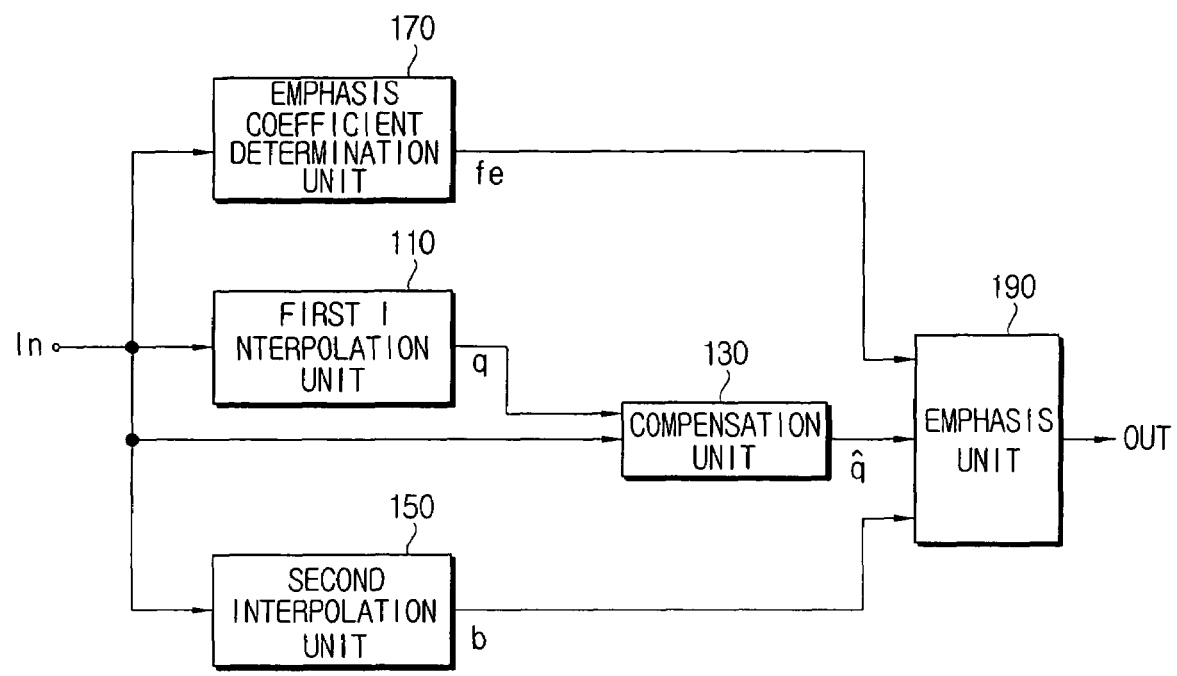
FIG. 1 is a block diagram illustrating an example of a digital image processing device according to an embodiment of the present invention.

FIG. 1 is a block diagram illustrating an example of a digital image processing device according to an embodiment of the present invention.

The digital image processing device has a first interpolation unit 110, a compensation unit 130, a second interpolation unit 150, an emphasis coefficient determination unit 170, and an emphasis unit 190.

The first interpolation unit 110 inputs low-resolution input image information enlarged by a predetermined magnification factor, and generates first interpolation image information q in a high-order interpolation scheme based on the low-resolution input image information. The high-order interpolation scheme, can be a second- or higher-order interpolation scheme, for example, the Spline interpolation scheme, and the Kaiser window method, and so on.

Figure 2A:
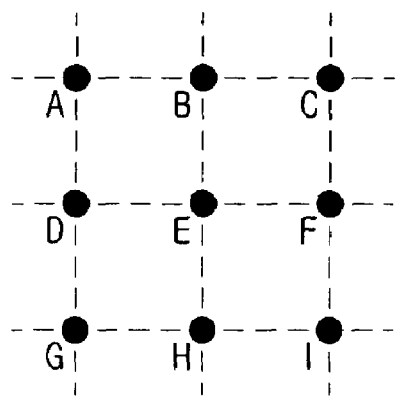
FIG. 2A is a diagram illustrating an example of a low-resolution input image information input to the digital image processing device.
Figure 2B:
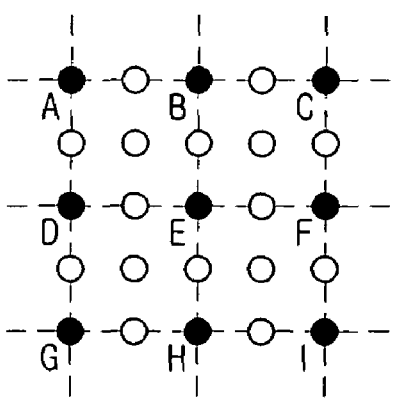
FIG. 2B is a diagram illustrating an example of an image interpolated in a predetermined scheme in relation to the low-resolution input image information shown in FIG. 2A.

FIG. 2A is a diagram illustrating an example of low-resolution input image information A, B, C, D, E, F, G, H, and I, which shows low-resolution input image information when an original image is twice enlarged. If the low-resolution input information A to I is interpolated in a predetermined scheme as shown in FIG. 2A, images are marked 'o' which are interpolated in the coordinates in the middle of original images marked '●'.

The compensation unit 130 generates binary values for the first interpolation image information q using the first interpolation image information q obtained from interpolation through the high-order interpolation scheme in the first interpolation unit 110 and the pixel values of the pixels A to I adjacent to a target pixel E which is a pixel at a position to be interpolated, and compensates for and outputs the first interpolation image information q using the binary values. That is, the compensation unit 130 outputs the compensated first interpolation image information $\hat{q}$.

The second interpolation unit 150 outputs second interpolation image information b through a linear interpolation scheme based on the low-resolution input image information A to I.

The emphasis coefficient determination unit 170 determines a certain emphasis coefficient fe between 0 and 1 in relation to pixel values of an image input through a predetermined transfer function.

Figure 5A:
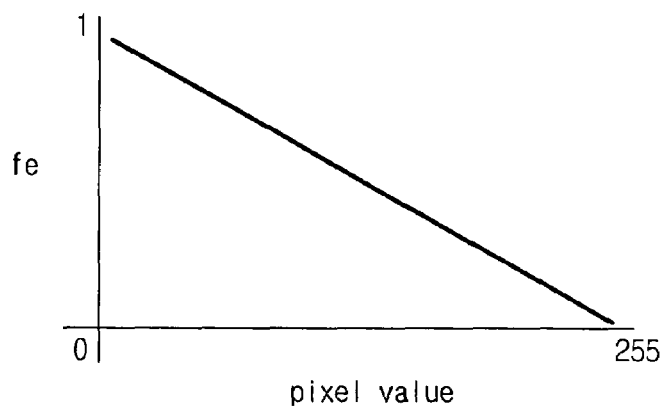
FIG. 5A through FIG. 5C are graphs illustrating examples of various transfer functions for determining emphasis coefficients in the emphasis coefficient determination unit 170 of FIG. 1 in relation to the input image information.
Figure 5B:
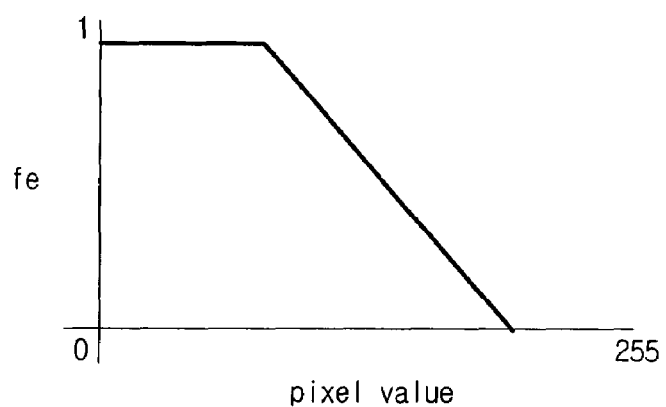
Figure 5C:
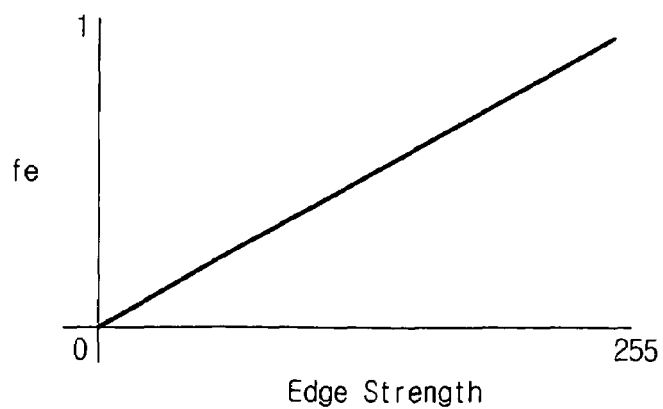

For example, FIG. 5A through FIG. 5C are graphs illustrating examples of various transfer functions determining an emphasis coefficient. FIG. 5A shows the determining of values between 0 and 1 in inverse proportion to pixel values, FIG. 5B shows when a value of 0 or 1 is applied within a certain range of input pixel values and linearly varied beyond the range, and FIG. 5C shows when an edge state is calculated based on input image information and then larger emphasis coefficients are applied as the edges increase.

Also, diverse schemes can be designed such as a scheme in which identical values are given for all occasions, a scheme in which values between 0 and 1 are given for values gradually decreasing or increasing in the same range with respect to pixel values of an input image or to edge states, and so on.

The enhancement unit 190 emphasizes the first interpolation image information $\hat{q}$ compensated in the compensation unit 130, second interpolation image information b linearly interpolated in the second interpolation unit 150, and the first interpolation image information $\hat{q}$ compensated using the emphasis coefficient fe is determined in the emphasis coefficient determination unit 170. Accordingly, a final output is obtained with the first interpolation image information $\hat{q}$ emphasized.

Figure 3:
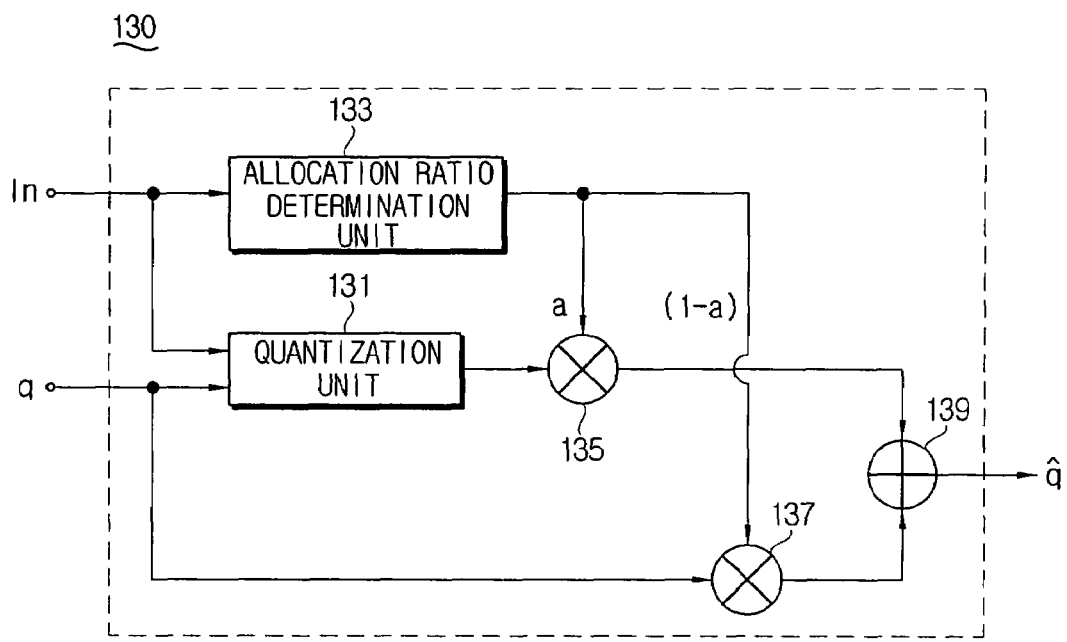
FIG. 3 is a detailed block diagram illustrating an example of the compensation unit 130 shown in FIG. 1.
Figure 4:
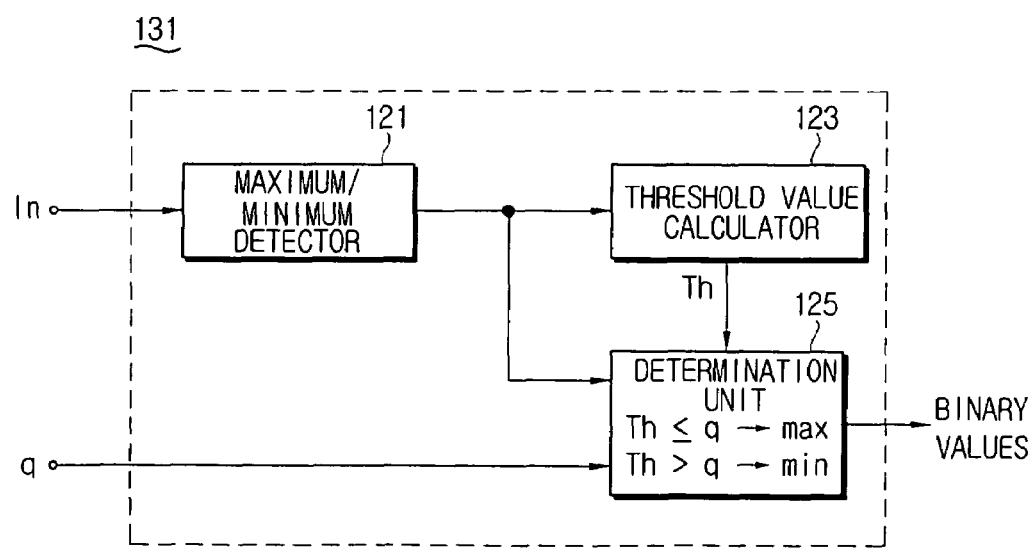
FIG. 4 is a detailed block diagram illustrating an example of the quantization unit 131 shown in FIG. 1.

FIG. 3 is a detailed block diagram illustrating an example of the compensation unit 130 of the digital image processing device according to an embodiment of the present invention, and FIG. 4 is a detailed block diagram f illustrating an example of the quantization unit 131 of the compensation unit 130.

The compensation unit 130 includes the quantization unit 131, an allocation ratio determination unit 133, a first multiplier 135, a second multiplier 137, and an adder 139.

The quantization unit 131 includes a maximum/minimum detector 121, a threshold value calculator 123, and a determination unit 125, as shown in FIG. 4.

The maximum/minimum detector 121 detects a maximum value max and a minimum value min using pixels adjacent to a target pixel at a position to be interpolated. That is, as shown in FIG. 2A, the maximum/minimum detector 121 detects the maximum value max and the minimum value min with respect to the target pixel E and the pixels A to I adjacent to the target pixel E.

The threshold value calculator 123 calculates a threshold value Th using a maximum value max and a minimum value min which are detected by the maximum/minimum detector 121. The threshold value Th can be determined on a middle value of the maximum and minimum values, on an average value of pixel values of adjacent pixels, or the like.

The determination unit 125 determines and outputs any of the maximum value max and the minimum value min. For the determination, the determination unit 125 compares the first interpolation image information q produced from the first interpolation unit 110 and the threshold value Th, and outputs the maximum value max if the first interpolation image information q is more than the threshold value Th, or outputs the minimum value min if the first interpolation image information q is less than the threshold value Th. Thus, the first interpolation image information to provide a sharper image can be obtained using any of the two values.

The allocation ratio determination unit 133 determines an allocation ratio "a" which is applied upon adding a binary value output from the quantization unit 131 and the first interpolation image information q, wherein $0 \leq a \leq 1$. The allocation ratio a can be calculated using pixel adjacent to a target pixel which I a pixel at a position to be interpolated, or determined by a user's selection from pre-set values. For example, the allocation ratio a can be obtained from a linearly varying curve using a difference between the maximum value max and the minimum value min of adjacent pixels, from a function varying stepwise due to a difference between the maximum value max and the minimum value min, from a non-linearly varying curve, or using pre-set values in a lookup table.

The first multiplier 135 multiplies a binary value output from the quantization unit 131 by an allocation ratio a determined in the allocation ratio determination unit 133 for an output, and the second multiplier 137 multiplies the first interpolation image information q and an allocation ratio 1-a determined based on the allocation ratio a for an output.

The adder 139 adds values respectively output from the first and second multipliers 135 and 137, and outputs compensated first interpolation image information $\hat{q}$.

That is, the binary value as to the first interpolation image information and the first interpolation image information q are multiplied by the allocation ratios a and 1-a respectively, the results of which are added so that compensated first interpolation image information $\hat{q}$ is output.

As described above, the first interpolation image information $\hat{q}$ compensated in the compensation unit 130 is input to the emphasis unit 190. The emphasis unit 190 emphasizes the compensated first interpolation image information $\hat{q}$ using the compensated first interpolation image information $\hat{q}$, the second interpolation image information b, and the emphasis coefficient fe. That is, the first interpolation image information Out emphasized in the emphasis unit 190 can be obtained by Equation 1 as follows:

$$OUT = \hat{q} + fe \times (\hat{q} - b) \quad \text{[Equation 1]}$$

Referring to Equation 1, the first interpolation image information $\hat{q}$ is emphasized by adding to the compensated first interpolation image information $\hat{q}$ a difference between the compensated first interpolation image information $\hat{q}$ and the linearly interpolated second interpolation image information b. In other words, if the difference between the compensated first interpolation image information $\hat{q}$ and the linearly interpolated second interpolation image information b is positive, the output OUT has a larger value with respect to the compensated first interpolation image information $\hat{q}$, and, on the contrary, if negative, the output OUT has a smaller value with respect to the compensated first interpolation image information $\hat{q}$, so that the first interpolation image information for which edges are sharply compensated is enhanced.

Accordingly, edge compensation (or edge sharpening) and edge emphasis are performed with respect to enlarged images, for example, interpolated images, so that the quality of enlarged images is improved.

Figure 6:
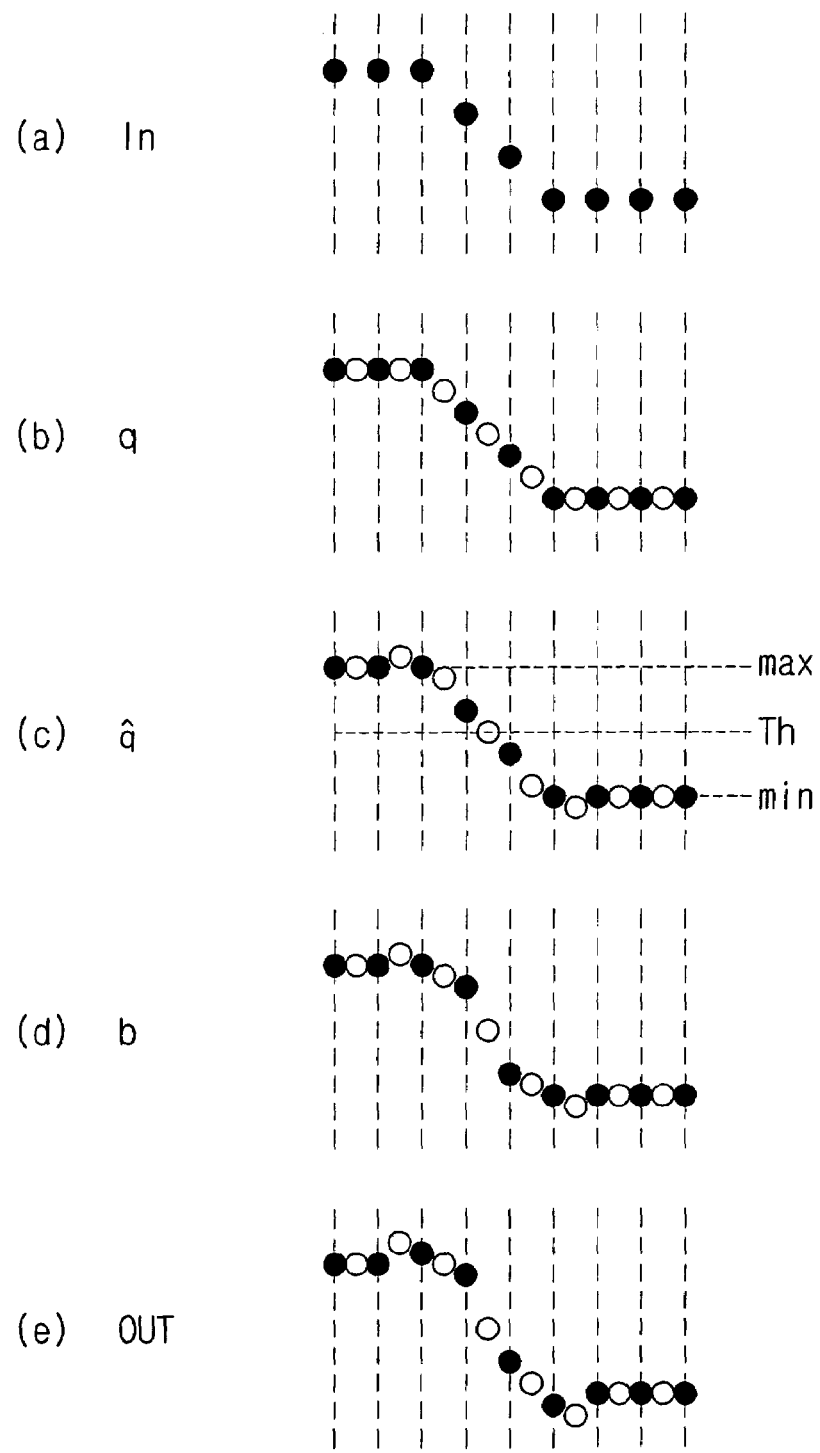
FIG. 6 is a diagram illustrating an example of outputs of the respective blocks of the digital image processing device shown in FIG. 1.
Figure 7:
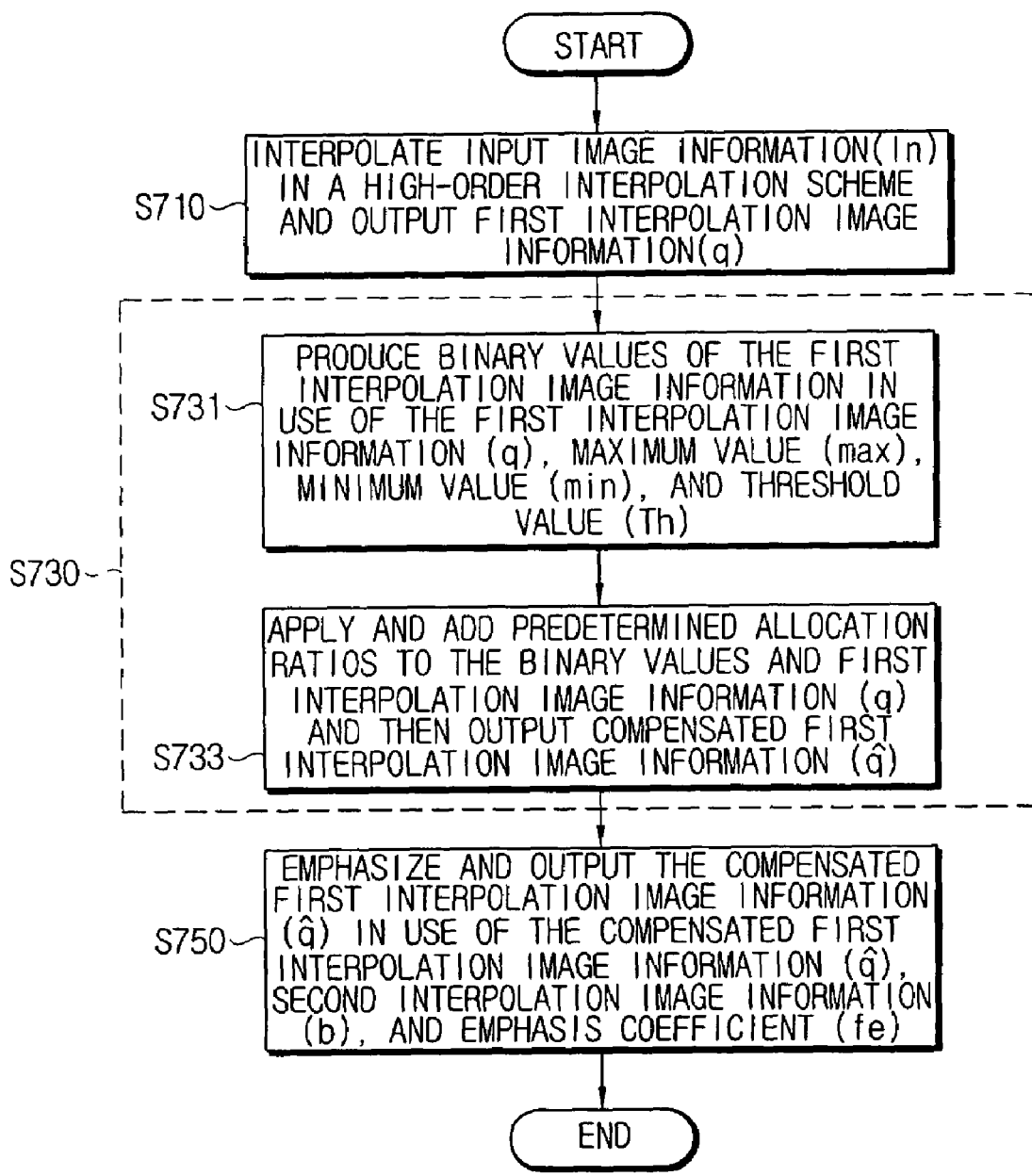
FIG. 7 is a flow chart for illustrating an example of a digital image processing method for the digital image processing device shown in FIG. 1.

Hereinafter, with reference to FIG. 6 and FIG. 7, a detailed description will be made on a process for carrying out the edge compensation and the edge emphasis for images interpolated by the digital image processing device according to an embodiment of the present invention. FIG. 6 is a view for schematically showing outputs processed through individual blocks of the digital image processing device shown in FIG. 1, for the purpose of easy understanding, and FIG. 7 is a flow chart for showing digital image processing procedures.

As shown in (a) of FIG. 6, low-resolution input image information In enlarged two times is input to the first interpolation unit 110, the second interpolation unit 120, and the emphasis coefficient determination unit 170. In here, the mark '●' denotes original images.

First, the input image information In input to the first interpolation unit 110 is interpolated in a high-order interpolation scheme, and, as shown in (b) of FIG. 6, the first interpolation image information q is output (S710). In here, the mark 'O' denotes images interpolated in correspondence to a two-times enlargement factor.

The compensation unit 130 compensates for the first interpolation image information q using the first interpolation image information q output from the first interpolation unit 110 and pixel values of the pixels A to I adjacent to the target pixel E which is a pixel at a position to be interpolated (S730). The compensated first interpolation image information $\hat{q}$ is the same as shown in (c) of FIG. 6.

In more detail, the quantization unit 131 generates binary values with respect to the first interpolation image information using the first interpolation image information q, maximum value max, minimum value min, and threshold value Th (S731). That is, quanization unit 131 compares the first interpolation image information q and the threshold value Th, outputs the maximum value max if the first interpolation image information q is larger than the threshold value Th, and, on the contrary, outputs the minimum value min if the first interpolation image information q is smaller than the threshold value Th, to output the binary values with respect to the first interpolation image information.

Thereafter, the adder 139 adds predetermined allocation ratios to the binary values and the first interpolation image information q to compensate for the first interpolation image information q (S733). That is, the first multiplier 135 multiplies the binary values of the first interpolation image information by the allocation ratio a, the second multiplier 137 multiplies the first interpolation image information q by the allocation ratio 1-a, and the adder 139 outputs the first interpolation image information $\hat{q}$ compensated for through the sum of the multiplications.

In the meantime, the second interpolation unit 150 outputs the second interpolation image information b in a linear interpolation scheme based on the input image information In, as shown in (d) of FIG. 6, and the emphasis coefficient determination unit 170 outputs the emphasis coefficient fe in correspondence to a pixel value of the input image information (refer to FIGS. 5A, 5B, and 5C).

The emphasis unit 190 emphasizes the first interpolation image information q̂ compensated for using the compensated first interpolation image information q̂ output in the compensation unit 130, the second interpolation image information b linearly interpolated in the second interpolation unit 150, and the emphasis coefficient fe determined in the emphasis coefficient determination unit 170 so as to output the emphasized first interpolation image information Out as shown in (e) of FIG. 6 (S750).

Accordingly, the embodiment of the present invention forms more natural edges of enlarged images, and, simultaneously, emphasizes edge brightness differences, so as to improve the quality of the enlarged images.

The embodiment of the present invention also emphasizes edge contrast using adjacent pixels with respect to interpolation positions of original images, as well as smooths the edge shapes.

Further, the embodiment of the present invention can simultaneously emphasize edges through an image enlargement process without extra units being provided for contrast emphasis at the edges of enlarged images.

Accordingly, the embodiment of the present invention eliminates stair-stepping artifact appearing on the edges of enlarged images, and emphasizes the quality of the enlarged images by emphasizing the edge brightness contrast.

Although the embodiments of the present invention have been described, it will be understood by those skilled in the art that the present invention should not be limited to the described embodiments, but various changes and modifications can be made within the spirit and scope of the present invention as defined by the appended claims.

What is claimed is:

1. A digital image processing device, comprising:
    a first interpolation unit for applying a predetermined interpolation scheme with respect to low-resolution input image information, and outputting first interpolation image information;
    a compensation unit for producing binary values with respect to the first interpolation image information using the input image information and the first interpolation image information, and compensating for the first interpolation image information based on the binary values;
    a second interpolation unit for applying a predetermined interpolation scheme with respect to the input image information, and outputting second interpolation image information; and
    an emphasis unit for emphasizing the compensated first interpolation image information using the second interpolation image information.

2. The digital image processing device as claimed in claim 1, further comprising an emphasis coefficient determination unit for determining an emphasis coefficient based on the input image information, wherein the emphasis unit emphasizes the compensated first interpolation image information using the emphasis coefficient determined in the emphasis coefficient determination unit and the second interpolation image information.

3. The digital image processing device as claimed in claim 1, wherein the emphasis unit emphasizes the compensated first interpolation image information using the emphasis coefficient determined by user's selection from at least one or more predetermined emphasis coefficients and the second interpolation image information.

4. The digital image processing device as claimed in claim 2, wherein the first interpolation image information 'Out' emphasized by the emphasis unit comprises:

$$Out = \hat{q} + fe \times (\hat{q} - b),$$

wherein 'q̂' denotes compensated first interpolation image information, 'fe' an emphasis coefficient, and 'b' second interpolation image information.

5. The digital image processing device as claimed in claim 1, wherein the first interpolation unit produces the first interpolation image information using a high-order interpolation scheme.

6. The digital image processing device as claimed in claim 1, wherein the second interpolation unit produces the second interpolation image information using a linear interpolation scheme.

7. The digital image processing device as claimed in claim 1, wherein the compensation unit further comprises:
    a quantization unit for generating the binary values with respect to the first interpolation image information using the input image information and the first interpolation image information;
    an allocation ratio determination unit for determining predetermined allocation ratios using pixel values of pixels adjacent to a target pixel of the input image information; and
    an adder for adding the binary values and the first interpolation image information to which the allocation ratios are respectively applied, and outputting the compensated first interpolation image information.

8. The digital image processing device as claimed in claim 7, wherein the quantization unit further comprises:
    a detector for detecting the predetermined number of pixel values from pixel values of the pixels adjacent to the target pixel of the input image information;
    a threshold value calculator for calculating a threshold value using the pixel values of the adjacent pixels; and
    a determination unit for comparing the first interpolation image information and the threshold value, and determining and outputting either a maximum value or a minimum value based on a comparison result.

9. The digital image processing device as claimed in claim 8, wherein the detector detects the maximum value and the minimum value based on the pixel values of the adjacent pixels, and the threshold value calculator calculates the threshold value using the maximum value and the minimum value.

10. A digital image processing method, comprising the steps of:
    applying a predetermined interpolation scheme with respect to low-resolution input image information, and outputting first interpolation image information;
    producing binary values with respect to the first interpolation image information using the input image information and the first interpolation image information, and compensating for the first interpolation image information based on the binary values;
    applying a predetermined interpolation scheme with respect to the input image information, and outputting second interpolation image information; and
    emphasizing the compensated first interpolation image information using the second interpolation image information.

11. The digital image processing method as claimed in claim 10, further comprising a step of determining an emphasis coefficient based on the input image information, wherein the emphasis step emphasizes the compensated first interpolation image information using the determined emphasis coefficient and the second interpolation image information.

12. The digital image processing method as claimed in claim 10, wherein the emphasis step emphasizes the compensated first interpolation image information using the emphasis coefficient determined by user's selection from at least one or more predetermined emphasis coefficients and the second interpolation image information.

13. The digital image processing method as claimed in claim 11, wherein the first interpolation image information Out emphasized by the emphasis step comprising:

$$\text{OUT} = \hat{q} + fe \times (\hat{q} - b),$$

wherein $\hat{q}$ denotes compensated first interpolation image information, fe an emphasis coefficient, and b second interpolation image information.

14. The digital image processing method as claimed in claim 10, wherein the first interpolation step produces the first interpolation image information using a high-order interpolation scheme.

15. The digital image processing method as claimed in claim 10, wherein the second interpolation step produces the second interpolation image information using a linear interpolation scheme.

16. The digital image processing method as claimed in claim 10, wherein the compensation step comprising the steps of:
  generating the binary values using the input image information and the first interpolation image information;
  determining predetermined allocation ratios using pixel values of pixels adjacent to a target pixel of the input image information; and
  adding the binary values and the first interpolation image information to which the allocation ratios are respectively applied.

17. The digital image processing method as claimed in claim 16, wherein the quantization unit comprising the steps of:
  detecting the predetermined number of pixel values from pixel values of the pixels adjacent to the target pixel of the input image information;
  calculating a threshold value using the pixel values of the adjacent pixels; and
  comparing the first interpolation image information and the threshold value, and determining and outputting either a maximum value or a minimum value based on a result of the comparison.

18. The digital image processing method as claimed in claim 17, wherein the detection step detects the maximum value and the minimum value based on the pixel values of the adjacent pixels, and the threshold value calculation step calculates the threshold value using the maximum value and the minimum value.

* * * * *